Patented Oct. 22, 1929

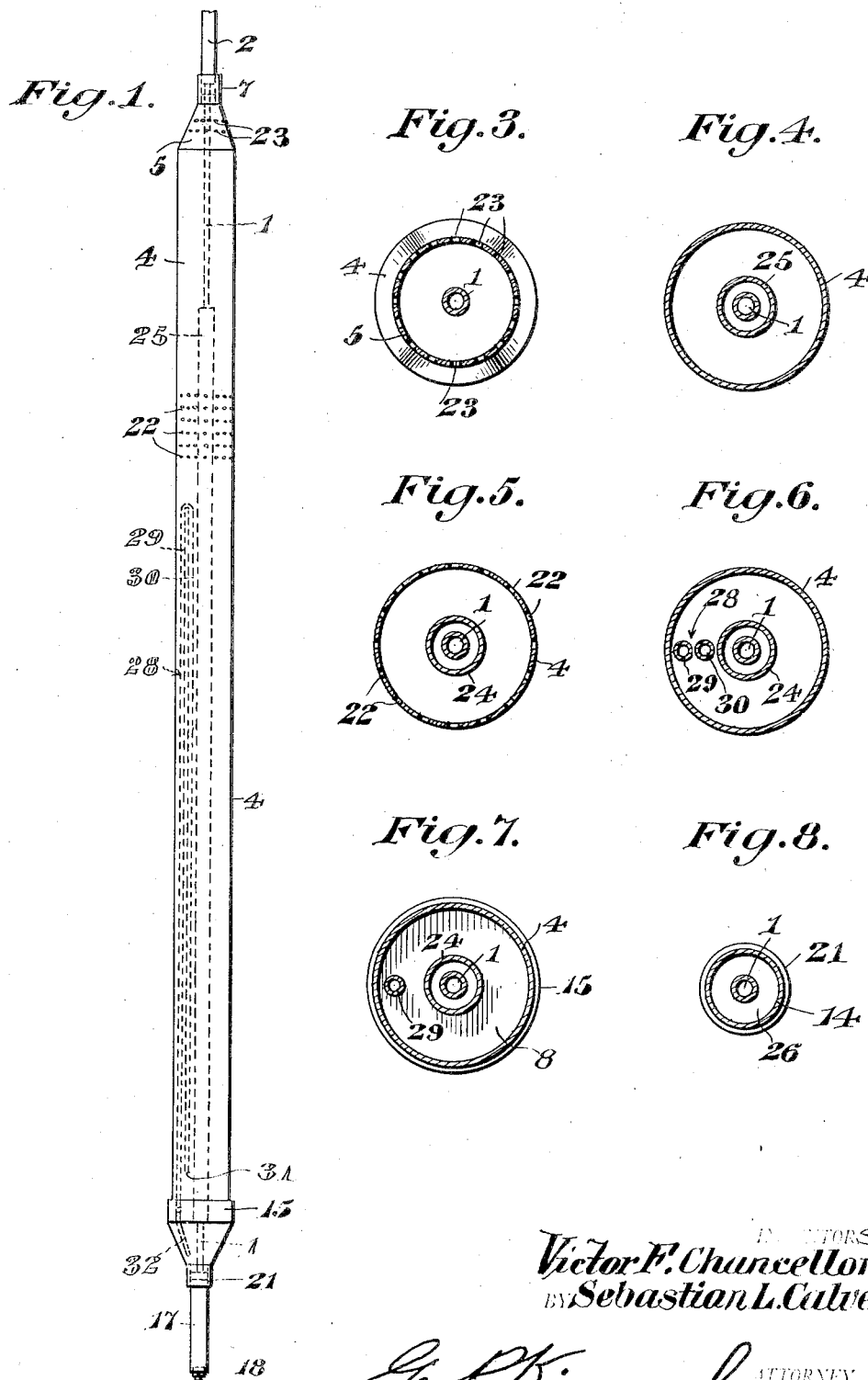

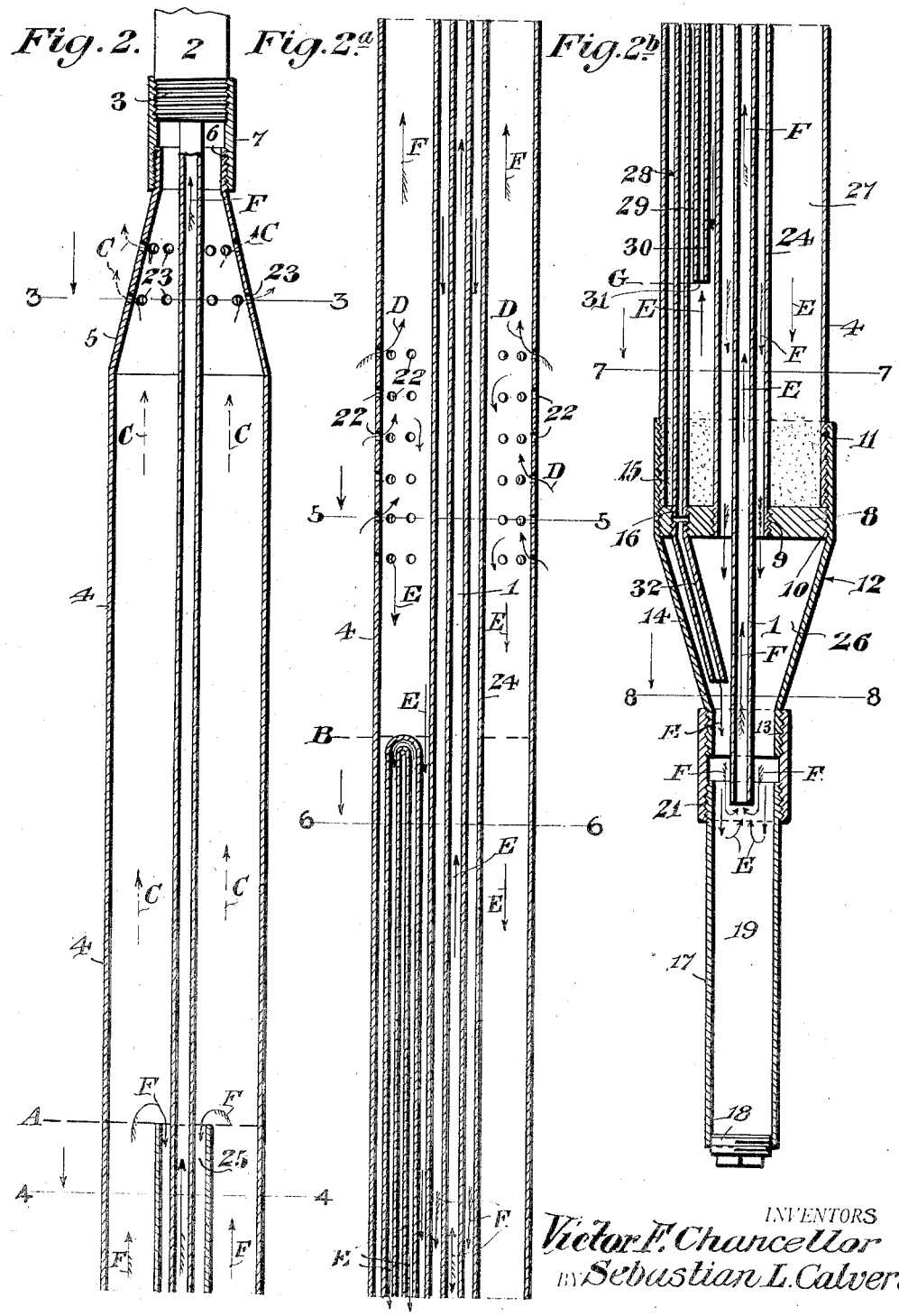

1,732,499

UNITED STATES PATENT OFFICE

VICTOR F. CHANCELLOR AND SEBASTIAN L. CALVERT, OF BRISTOW, OKLAHOMA

APPARATUS FOR SEPARATING GAS FROM OIL AND WATER

Original application filed January 5, 1926, Serial No. 79,461. Divided and this application filed June 11, 1926. Serial No. 115,302.

This invention relates to an apparatus for separating gas from oil and water and is a division of our application filed January 5, 1926, Serial No. 79,461, and the invention has for its object to provide, in a manner as hereinafter set forth, during the pumping operation with respect to an oil well, the automatic separation of the gas from the oil and water and for the discharge of the separated gas independent of the oil and water from which the gas is separated.

Further objects of the invention are to provide, in a manner hereinafter set forth an apparatus for separating gas which is comparatively simple in its construction and arrangement, strong, durable, thoroughly efficient in its use, readily installed with respect to the working barrel of a pump, and comparatively inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications in the construction can be resorted to which fall within the scope of the claims hereunto appended.

In the drawings wherein like reference characters denote corresponding parts throughout the several views:—

Figure 1 is an elevation of a separator, in accordance with this invention.

Figures 2, 2ª and 2ᵇ, when taken together, illustrate in longitudinal section a separator, in accordance with this invention.

Figures 3 and 4 are respectively sections on lines 3—3 and 4—4, Figure 2.

Figures 5 and 6 are respectively sections on lines 5—5 and 6—6, Figure 2ª.

Figures 7 and 8 are respectively sections on lines 7—7 and 8—8, Figure 2ᵇ.

Referring to the drawings, the apparatus comprises a conducting tube 1 of appropriate diameter and which is connected at its upper end to and communicates with the working barrel 2 of an oil well pump. The barrel 2, at its lower end, is peripherally threaded, as at 3. The conducting tube 1 is of appropriate length and is open at its lower end. The tube 1 provides means for conducting a body or head of oil for discharge as well as for conducting a body or head of water for discharge, and the body of oil is discharged independently of the discharge of the body of water, or in other words the said bodies are alternately discharged from the apparatus.

Surrounding the conducting tube 1 and of materially greater diameter than the diameter thereof, is a tubular casing 4 having a tapered upper end 5, formed with a peripherally threaded annular collar 6, which is connected to the working barrel 2 by an interiorly threaded coupling sleeve 7, which connects the casing 4 with and suspends it from the lower end of the working barrel 2. The collar 6 and sleeve 7 are of materially greater diameter than the conducting tube 1. The casing 4 has its lower end positioned a substantial distance above the lower end of the conducting tube 1, and abutting against the lower end of the casing 4 as well as secured therewith, in a manner to be presently referred to, is a closure disk 8 of substantial thickness and of the same diameter as the outer diameter of the casing 4. The disk 8 is formed with a centrally disposed opening 9 of substantial diameter and which has the wall thereof threaded. The disk 8 is furthermore provided with peripheral threads 10 throughout its outer edge. The lower terminal portion of the casing 4 is formed with peripheral threads 11.

Threadedly engaging with the threads 11, on the casing 4, is a combined securing and suspension member, referred to generally by the reference character 12 and which depends a substantial distance below the lower end of the casing 4. The member 12 comprises a lower portion 13, in the form of a peripherally threaded collar, an intermediate tapering portion 14 and an interiorly threaded upper portion 15, which threadedly engages with the lower terminal portion of the casing 4 and the threads 10 on the outer edge of the disk 8, and by this arrangement the latter is maintained in position against the lower end of the tube 4 and further said member 12 is secured in suspended position. The disk 8, at a point between the opening 9 and its outer edge, is formed with a vertically disposed opening 16 of materially less diameter than the opening 9, and said opening 16 has the wall thereof threaded throughout. The purpose of the openings 9 and 16 will be presently referred to.

Arranged below the member 12 and of appropriate length is a tubular element 17, closed at its bottom, as at 18, and which provides a receiving chamber 19 for the separated oil or the separated water and from said chamber 19 the oil or water is drawn up through the conducting tube 1 by the suction action of the pump. The tubular element 17 is provided at its upper terminal portion with peripheral threads 20 and engaging these latter and the collar 13 is an interiorly threaded coupling sleeve 21 for securing the tubular element 17 with the member 12.

The casing 4, at a point between its transverse center and its upper end is formed with superposed sets of circumferentially extending openings 22 providing inlets for a body of gas, oil and water, and the tapered portion 5 of the casing 4 is formed with superposed sets of circumferentially extending openings 23, which provide outlets for the separated gas.

Secured to the threaded wall of the opening 9 is a vertically extending tube 24 of less length than the length of the casing 4 and of a length to extend above the inlets 22. The tube 24 is of appropriate inner diameter to provide in connection with the conducting tube 1 an oil passage 25. The tube 24 is flush at its lower edge with the lower face of the disk 8, is open at its upper and lower ends and discharges into a directing chamber 26 at a point above the inlet end of the conducting tube 1, and the latter extends down through the directing chamber 26 and terminates at the upper end of the receiving chamber 19. The tube 24, in connection with the casing 4, provides a collecting chamber for the oil and water and which also acts as a sand trap for any sand which is in the body of gas, oil and water when such body is drawn into the casing 4 through the inlets 22. The collecting chamber 27 is of less height than the casing 4.

Secured in the upper part of the opening 16 is the lower end of a vertically disposed substantially U-shaped siphoning tube, referred to generally by the reference character 28 and which is of materially less height than the height of the collecting chamber 27. The outer leg of the siphoning tube is indicated at 29, and the inner leg at 30. The leg 29 is of greater length than the leg 30 and said leg 29 is secured to the wall of the opening 16. The inlet end 31 of the leg 30 is positioned a substantial distance above the bottom of the collecting chamber 27 and the said bottom is formed by the disk 8. Connected in the lower portion of the opening 16 and depending from the disk 8 is an inclined discharge nozzle 32, which opens into the lower end of the directing chamber 26. The siphoning tube 29 communicates with the upper end of the nozzle 32.

The oil level is indicated at A. The water level is indicated at B. The travel of the gas is indicated by the arrows C. The arrows D indicate the entering of the body of gas, oil and water into the casing 4. The arrows E indicate the travel of the water, and the arrows F indicate the travel of the oil. The arrows C show the course taken by the gas after it has been agitated out of the oil by being drawn through inlets 22 and escaping through the outlets 23 to the outside of the separator.

With reference to the operation of the separator, it is well known that in oil field pumping operations, that all fluid is very seldom pumped from the well before the pumping operation is discontinued or shut down, and that if at any time when all fluid is pumped or drawn from the well, the operation of the pumping apparatus is stopped and remains dormant until the fluid again accumulates in the well, at which time the pumping action is then started.

It will be noted that the function of the separator is to provide for the discharge of the gas independent of the water and oil and for the independent discharge of the oil with respect to the water, before either or all has entered the working barrel 2, to overcome the objection that when the gas combined with the oil and water enters the barrel 2, it causes the oil to cut or form an emulsion and which decreases the value of the oil.

The combined body of gas, oil and water enters at 22 and the gas rises to the level of the liquid and the rise of the gas is assisted by agitation due to the rise and fall of the level of the oil. The gas passes from the level of the oil and travels upwardly to the tapered portion 5, and then passes out through the discharge outlets 23. As the level of the oil lowers below the point A, the gas continues to rise from the oil and travels toward the outlets 23. The passing off of the gas is continuous on the rise and fall of the level of the oil during the oil and water separating steps and also the gas passes from the combined body of gas, oil and water when said body enters the casing at the inlet 22.

The separation of the oil and water and alternate discharge therof is obtained in the following manner:

The water and oil accumulates, the oil above the water, in the chamber 27 until the oil overflows at A, the water at this time being below the point B. The distance between points A and B is such that oil will overflow into the tube 24 before the siphon will start operation. As long as the water remains below the point B, the oil is being pumped out. When the water reaches the point B the discharge of oil stops and water siphons down through 32 and is pumped out. This continues until the water drops below the point G. At this time the oil will siphon out through 32 and will be pumped out of the receiving chamber 19 until the oil level has dropped below the point G. The foregoing siphoning operation is again carried out when the water and oil reach the points B and G.

What we claim is:

1. An apparatus for separating gas from a combined body of gas, oil and water comprising a casing closed at its lower end and adapted to be suspended from and closed at its upper end to the working barrel of a well pumping apparatus, a tubular element suspended from said casing, closed at its lower end and having its upper end closed by the bottom of said casing, a conducting pipe common to oil and water and leading from said element, through said casing to said working barrel, said casing provided above its transverse median with circumferentially disposed inlets for a combined body of gas, oil and water, the upper portion of said casing providing a passage for the upward flow of the gas separated from such combined body, oil and water carrying off means within said casing and opening into said element for elevating and lowering the level of the oil within the casing to provide for the agitation of the liquid to assist the gas to rise to the level of the oil, and said casing having its upper end provided with outlets for the discharge therefrom of the separated gas.

2. An apparatus for separating gas from a combined body of gas, oil and water comprising a casing closed at its lower end and adapted to be suspended from and closed at its upper end to the working barrel of a well pumping apparatus, a tubular element suspended from said casing, closed at its lower end and having its upper end closed by the bottom of said casing, a conducting pipe common to oil and water and leading from said element, through said casing to said working barrel, said casing provided above its transverse median with circumferentially disposed inlets for a combined body of gas, oil and water, the upper portion of said casing providing a passage for the upward flow of the gas separated from such combined body, oil and water carrying off means within said casing and opening into said element for elevating and lowering the level of the oil within the casing to provide for the agitation of the liquid to assist the gas to rise to the level of the oil, and said casing having its upper end provided with outlets for the discharge therefrom of the separated gas, said upper end of said casing being of conoidal contour and said outlets being formed therein.

3. An apparatus for separating gas from a combined body of gas, oil and water comprising a casing adapted to have its upper end suspended from and closed to the working barrel of a well pumping apparatus, a closure for the bottom of said casing formed with a central opening, a vertically disposed tubular member, open at each end and arranged within and of less height than said casing, said member having its lower end secured to the wall of said opening and forming in connection with said casing a receiving chamber, a tubular element suspended from said casing and closed at its ends, a conducting pipe common to oil and water and leading from said element through said member to the working barrel, said casing provided above its transverse median with inlets for a combined body of gas, oil and water, the upper portion of said casing providing a passage for the upward flow of the gas separated from such combined body, oil and water carrying off means within said chamber and opening into said element for elevating and lowering the level of the oil within said chamber to provide for the agitation of the liquid to assist the gas to rise to the level of the oil, and said casing having its upper end provided with outlets for the discharge therefrom of the separated gas.

4. An apparatus for separating gas from a combined body of gas, oil and water comprising a casing adapted to have its upper end suspended from and closed to the working barrel of a well pumping apparatus, a closure for the bottom of said casing formed with a central opening, a vertically disposed tubular member, open at each end and arranged within and of less height than said casing, said member having its lower end secured to the wall of said opening and forming in connection with said casing a receiving chamber, a tubular element suspended from said casing and closed at its ends, a conducting pipe common to oil and water and leading from said element through said member to the working barrel, said casing provided above its transverse median with inlets for a combined body of gas, oil and water, the upper portion of said casing providing a passage for the upward flow of the gas separated from such combined body, oil and water carrying off means within said chamber and opening into said element for elevating and lowering the level of the oil within said chamber to provide for the agitation of the liquid to assist the gas to rise to the level of the oil, and said casing having its upper end provided with outlets for the discharge therefrom of the separated gas, said inlets disposed in spaced, circumferentially extending rows, and the upper end of said casing of conoidal contour and said outlets arranged therein in superposed, spaced, circumferential rows.

In testimony whereof, we affix our signatures hereto.

SEBASTIAN L. CALVERT.
VICTOR F. CHANCELLOR.